May 2, 1950 J. YUSHAK 2,506,322
DOG EXERCISING MACHINE
Filed July 30, 1948
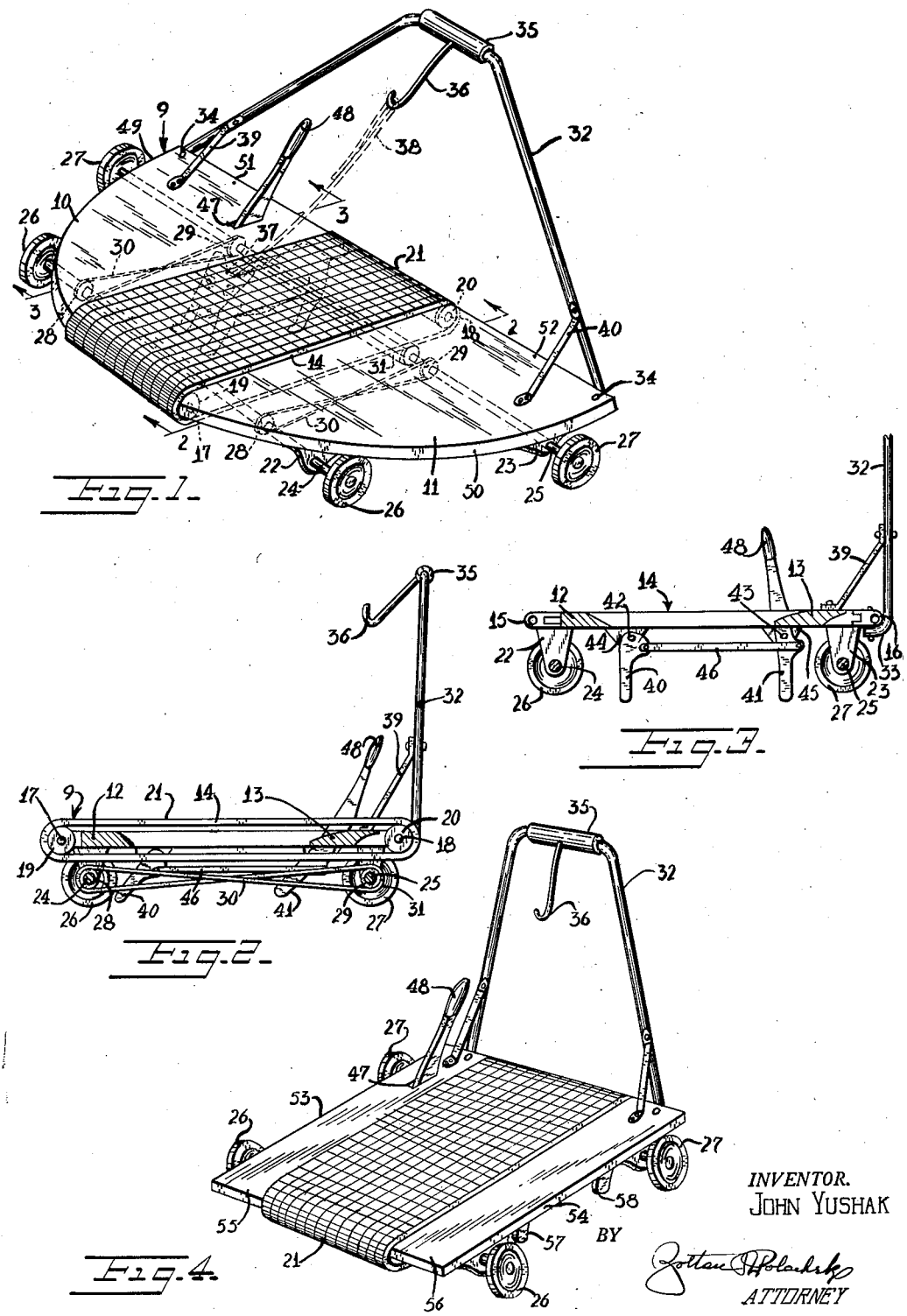
INVENTOR.
JOHN YUSHAK
BY
ATTORNEY Patented May 2, 1950

2,506,322

UNITED STATES PATENT OFFICE 2,506,322

DOG EXERCISING MACHINE

John Yushak, Garfield, N. J.

Application July 30, 1948, Serial No. 41,457

7 Claims. (Cl. 119—29)

The present invention relates to a dog or pet exercising vehicle, with particular reference to a manually guided and controlled vehicle upon which a dog may be caused to take his exercise.

The main object of the invention is to provide a vehicle for exercising house-bound dogs and pets by causing the same to run upon an endless belt or chain tread offering a certain amount of resistance to movement of the feet of the animal.

An important object is also to provide such an exercising vehicle with manually controlled means for changing the resistance offered to the operation of the belt tread at will.

Another object is to have an exercising vehicle of the character indicated which in one form has the two side edges thereof curved and widened toward the rear.

A further object is to provide such a vehicle with a fixed handle by which it may be pushed, guided and tilted either forwards or backwards, as desired.

It is likewise an object to have such an exercising vehicle which has front wheels and rear wheels so connected to the endless tread as to be driven in opposite directions thereby.

It is even an object on such an exercising vehicle to include shiftable means for raising the vehicle upon stationary feet with the wheels of said vehicle out of contact with the floor or ground to allow easy exercising of the animal in situ without causing travel of the vehicle.

Other objects and certain advantages of the invention will appear in greater detail as the specification proceeds.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a perspective view of a dog exercising vehicle made according to the principles of this invention and embodying the same in a practical form.

Fig. 2 is a longitudinal section of the same exercising vehicle taken on line 2—2 in Fig. 1.

Fig. 3 is a similar section of said vehicle taken on line 3—3 in Fig. 1, showing certain parts in shifted positions in contrast with Fig. 2.

Fig. 4 is a perspective view illustrating a modification.

Throughout the views, the same reference numerals indicate the same or like parts.

Out in the country, the various family pets, and especially pet dogs have ample space for running about and obtaining sufficient exercise. The dogs usually remain outside the house all day, and if taken into the house at all, are inside only at night, so that there is never any question about sufficient exercise for such animals. Frequently, the children in the family romp and play with the family dog and the latter thus has plenty of opportunity for running every day and is traditionally lying about resting in the evening when the family is at home in the living room of the house.

In our cities, however, especially the large cities, where formerly there were many open lots and empty spaces affording dog owners opportunities for releasing their dogs to run and play, the situation is different. In other words, the cities are now so far built up, and such large sections of these cities are occupied by apartment houses, that practically nothing but bare sidewalks are found outside the houses, while parks are often so far off as to be too much trouble to reach. Thus, the city dogs whose owners keep them in city houses and apartments most of the time, cannot spend too much time on the streets with their dogs, and the latter are therefore prone to aging and deterioration due to lack of exercise.

In order to remedy such conditions, and with the foregoing objects in view, it is now proposed to provide a special exercising vehicle for a dog, which may be used in the house in stationary condition, or moved about upon the street outdoors.

Hence, in the practice of the invention, and referring again to the accompanying drawing, a dog exercising vehicle, generally indicated at 9, has a platform frame including two platform members 10 and 11, preferably of wood or the like rigidly connected together by a pair of integral bridge members 12 and 13 spaced apart to form an intermediate clearance gap 14 for a purpose soon to appear. Upon the forward and rear ends of the platform members are attached bearings 15 and 16 to receive the stub shafts 17 and 18 of forward and rear supporting rollers 19 and 20 upon which an endless belt or chain tread 21 is mounted to run forwardly or rearwardly thereon, and when loaded, may sag slightly toward or into the clearance opening 14.

Beneath the platform members are rigidly depending bearing lugs 22 and 23 through which extend a pair of rotatable shafts 24 and 25 upon the ends of which are fixed traction wheels 26, 26 and 27, 27 exteriorly of the bearing lugs, so as to provide for rolling the vehicle along the floor or on a street. Both of the mentioned shafts are provided with a pair of pulleys at 28, 28 and 29, 29 connected by a pair of crossed belts 30, 30 which obviously cause the forward shaft to be rotated in the opposite direction to that of the rear shaft when driven, and vice versa. When the forward wheels 26, 26 thus rotate counterclockwise by friction with the ground upon forward travel of the vehicle, the crossed belt connections will cause rear shaft 25 and wheels 27, 27 to tend to rotate clockwise.

In order to drive the shafts and wheels and thus tend to propel the vehicle, rear shaft 25 carries an intermediately fixed driving roller 31 in effective frictional contact with the lower span of the belt or chain tread 21 to be driven by the latter for driving the mentioned wheels. To facilitate handling the vehicle manually, an upwardly projecting rigid handle frame 32 is secured by attachment lugs 33, 33 to the rear ends of the platform members and are held in place by rivets or bolts 34, 34. From the handle proper 35 projects a forwardly extending fixed leash hook 36.

If a dog is placed on the tread 21 and retained captive to the leash 38 by hooking the same to hook 36, this dog by running on the tread will drive the latter rearwardly and thereby rotate roller 31 and rear wheels 27 counterclockwise. This roller may be toothed or knurled (not shown) in order to increase the traction between the same and the tread, if desired, and the handle frame may be steadied by a pair of stays 39 and 40 bolted or riveted thereto at their upper ends and similarly attached at their lower ends to the platform members. Then if the handle 35 is grasped and the vehicle held tilted slightly toward the rear with the front wheels 26 off the ground, the rear wheels will propel the vehicle forward, driven by the dog trotting on the tread. Naturally, when the latter is driven in this fashion, the vehicle by means of the tread offers a limited resistance to the trotting of the dog.

When a slightly greater resistance is desired, the vehicle is tilted slightly forward to raise the rear wheels and allow the dog to tend to propel the vehicle backwards, while at the same time the latter vehicle is pushed forward in opposition to the dog's driving. If the vehicle is simply allowed to rest on all four wheels when the dog exercises, the opposite rotation of the front and rear wheels will give rise to opposing friction to require considerable effort on the part of the dog to keep the tread moving.

Thus far, the vehicle has been described for use either in the house or on the street, but preferably the latter. For the house in particular, and also in order to provide an even smaller resistance than already outlined, the vehicle is also provided with a group of swingably mounted feet 40, 41, (two shown) mounted on shafts 42 and 43 supported in bearing lugs 44 and 45 projecting down beneath the platform members, the pair on each side being linked together by a link 46 pivotally connected at the ends thereof by pins or the like to said feet or legs. One of the latter, leg 41 extends upwardly through a slot 47 and terminates in a handle 48, and when this is shifted forward, the link causes the forward leg to move with the rear leg integral with the handle. At least rear shaft 43 extends to the other side of the vehicle to one of the legs (not shown) which is linked to the front leg (also not shown but understood) from the legs or feet 40, 41 and the link 46 just described.

Normally, the feet are swung or raised out of contact with the floor to allow either the four or only two of the wheels to support the vehicle in the above described manner. Manually swinging handle lever 48 forward will swing all the feet down from their inactive position of Fig. 2 to the active lowered position shown in Fig. 3. In the latter position, it is clear that the front and rear wheels will be allowed to idle, and the resistance offered to the dog's movements will be at a minimum.

In the form of the invention shown, the platform members are of nearly triangular shape, their side edges 49 and 50 being substantially parallel with the endless belt 21, presenting the wide ends 51 and 52 to the rear. The wider portions of the platform members serve to support the dog when resting and when the vehicle is manually pushed or pulled along without exercising the dog. On the other hand, in the form of vehicle shown in Fig. 4, the sides 53 and 54 of relatively narrow platform members 55 and 56 are substantially straight and parallel, the net result being that the vehicle as a whole is narrow, so as to be suitable for storing in narrow spaces and active use on narrow sidewalks or narrow floors. All of the other parts and details are precisely the same as in the form shown in Figs. 1 to 3, except that the traction shafts 24 and 25 are naturally shorter, and, the second pair of feet 57 and 58 also appears. It should be mentioned that in Fig. 1, the feet are not indicated merely for the sake of clarity in the view.

The platform members may be made of wood, plastic or metal or any combination thereof, while the wheels may be made either of similar material or any other suitable material. The bearing lugs, feet and links may be made of metal or plastic, etc., and the tread belt may be of leather, fabric or flexible plastic or combined fabric and plastic material, or may even be a plastic or metal chain structure without departing from the spirit of the invention.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A dog exercising vehicle having a frame comprising two spaced platforms connected by bridge members integral therewith, rollers mounted for rotation at the front and rear ends of said frame, an endless traction belt passed around said rollers, brackets depending from said frame, axles mounted for rotation in each of said brackets, ground engaging wheels fixed to said axles, a friction roller mounted on one of said axles and engaging a portion of said endless belt, and means interconnecting said axles effecting contra-rotation of said axles and ergo, said wheels, whereby a substantial resistance will be offered to movement of said endless belt relative to said frame.

2. A dog exercising vehicle as defined in claim 1, wherein said means comprises pulleys fixed to each of said axles and a crossed belt connecting said pulleys.

3. A dog exercising vehicle as defined in claim 2, wherein said frame is provided with a handle rigidly attached at the rear of said platforms to effect forward or rearward tilting of said vehicle.

4. A dog exercising vehicle having a frame comprising two spaced platforms connected by bridge members integral therewith, rollers mounted for rotation at the front and rear ends of said frame, and an endless traction belt passed around said rollers, brackets depending from said frame, said brackets carrying axles mounted for rotation therein, ground engaging wheels fixed to said axles, a friction roller mounted on one of said axles and engaging a portion of said endless belt, means effecting contra-rotation of said axles, and ergo, the wheels, said means comprising a pulley fixedly mounted on each of said axles, a crossed belt connecting said pulleys, and means elevating said wheels to disengage them from the ground.

5. A dog exercising vehicle as defined in claim 4, wherein the last named means comprises a plurality of brackets integral with the underside of said platforms, rods extending between said brackets and mounted for rotation therein, legs fixedly attached outwardly of said brackets on said rods, and links connecting opposite pairs of said legs.

6. A dog exercising vehicle as defined in claim 5, wherein one of said platforms is slotted, and one of said legs extends upwardly therethrough to provide an operating lever for the raising and lowering of said legs.

7. A dog exercising vehicle as defined in claim 6, wherein said frame is provided at the rear end thereof with a handle rigidly attached thereto.

JOHN YUSHAK.

REFERENCES CITED

The following references are of record in the file of this patent:

UNITED STATES PATENTS

| Number | Name | Date |
| --- | --- | --- |
| 8,730 | Holly | Feb. 10, 1852 |
| 1,349,941 | Broome | Aug. 17, 1920 |
| 1,350,546 | Culver | Aug. 24, 1920 |
| 1,614,086 | Schaper | Jan. 11, 1927 |
| 2,155,684 | Richards | Apr. 25, 1939 |